United States Patent
Mori et al.

(10) Patent No.: US 11,156,516 B2
(45) Date of Patent: Oct. 26, 2021

(54) ABNORMALITY DETERMINATION DEVICE AND ABNORMALITY DETERMINATION METHOD

(71) Applicant: IHI Corporation, Koto-ku (JP)

(72) Inventors: Hatsuo Mori, Koto-ku (JP); Keisuke Suzuki, Koto-ku (JP); Noriyoshi Mizukoshi, Koto-ku (JP); Takashi Ogai, Koto-ku (JP)

(73) Assignee: IHI Corporation, Koto-ku (JP)

( * ) Notice: Subject to any disclaimer, the term of this patent is extended or adjusted under 35 U.S.C. 154(b) by 368 days.

(21) Appl. No.: 16/085,791

(22) PCT Filed: Dec. 19, 2016

(86) PCT No.: PCT/JP2016/087790
§ 371 (c)(1),
(2) Date: Sep. 17, 2018

(87) PCT Pub. No.: WO2017/158976
PCT Pub. Date: Sep. 21, 2017

(65) Prior Publication Data
US 2019/0033152 A1    Jan. 31, 2019

(30) Foreign Application Priority Data

Mar. 18, 2016   (JP) .............................. JP2016-054912

(51) Int. Cl.
*G01L 7/18*   (2006.01)
*F02K 9/52*   (2006.01)
(Continued)

(52) U.S. Cl.
CPC ................. *G01L 7/18* (2013.01); *F02K 9/46* (2013.01); *F02K 9/50* (2013.01); *F02K 9/52* (2013.01);
(Continued)

(58) Field of Classification Search
CPC ..... F02K 9/52; F02K 9/46; F02K 9/50; G01L 27/02
See application file for complete search history.

(56) References Cited

U.S. PATENT DOCUMENTS 5,332,356 A    7/1994  Gülich
6,480,792 B1   11/2002 Prendergast
(Continued)

FOREIGN PATENT DOCUMENTS

JP    2-10000 A    1/1990
JP    9-243518 A   9/1997
(Continued)

OTHER PUBLICATIONS

Uchumi and Kamijo, "Fatigue Strength of Rocket Pump Inducers"; 2006; 7 pages (Year: 2006).*

(Continued)

*Primary Examiner* — Kira Nguyen
(74) *Attorney, Agent, or Firm* — Oblon, McClelland, Maier & Neustadt, L.L.P.

(57) ABSTRACT

An abnormality determination device according to one aspect of the present disclosure is an abnormality determination device that determines an abnormality of an inducer used for a pump, the abnormality determination device including a stress-response acquisition unit that acquires a stress response indicating a temporal change in stress applied to the inducer, an accumulated-fatigue-damage-degree calculation unit that calculates an accumulated fatigue-damage degree of the inducer based on the stress response, a lifetime-consumption-rate calculation unit that calculates a lifetime consumption rate that is a changing rate of the accumulated fatigue-damage degree with respect to time, and a determination unit that determines an abnormality of the inducer based on the accumulated fatigue-damage degree and the lifetime consumption rate, in which the (Continued)

inducer is used only for a predetermined use time per operation of the pump.

5 Claims, 8 Drawing Sheets

(51) Int. Cl.
    *F04D 29/22* (2006.01)
    *F04D 15/00* (2006.01)
    *G01M 13/00* (2019.01)
    *G01M 5/00* (2006.01)
    *G05B 23/02* (2006.01)
    *F02K 9/46* (2006.01)
    *F02K 9/50* (2006.01)
    *G01L 27/02* (2006.01)

(52) U.S. Cl.
    CPC ..... *F04D 15/0088* (2013.01); *F04D 29/2277* (2013.01); *G01L 27/02* (2013.01); *G01M 5/00* (2013.01); *G01M 13/00* (2013.01); *G05B 23/0283* (2013.01); *F05D 2260/821* (2013.01)

(56) References Cited

U.S. PATENT DOCUMENTS

| | | |
|---|---|---|
| 8,864,441 B1 | 10/2014 | Pinera |
| 2004/0030524 A1 | 2/2004 | Jarrell |
| 2006/0228214 A1 | 10/2006 | Mabe et al. |
| 2009/0133381 A1* | 5/2009 | Holmes ................. G06F 30/15 60/204 |
| 2009/0204245 A1* | 8/2009 | Sustaeta ................ H04L 67/125 700/99 |
| 2009/0287448 A1* | 11/2009 | Brown ..................... G07C 3/00 702/130 |
| 2010/0235109 A1* | 9/2010 | Zhao ..................... G06Q 10/20 702/34 |
| 2011/0046897 A1 | 2/2011 | Blumenthal et al. |
| 2012/0152007 A1* | 6/2012 | Holmes ................... G06F 30/15 73/112.01 |
| 2014/0114587 A1* | 4/2014 | Czerniak ............ G05B 23/0283 702/34 |
| 2015/0081121 A1 | 3/2015 | Morgan et al. |
| 2015/0185111 A1 | 7/2015 | Armstrong et al. |
| 2015/0322789 A1* | 11/2015 | Pandey .................. F01B 25/00 702/34 |

FOREIGN PATENT DOCUMENTS

| | | |
|---|---|---|
| JP | 11-280410 A | 10/1999 |
| JP | 2001-329856 A | 11/2001 |
| JP | 2002-528731 A | 9/2002 |
| JP | 2008-537048 A | 9/2008 |
| JP | 2009-2168 A | 1/2009 |
| JP | 2009-503329 A | 1/2009 |
| JP | 2010-519450 A | 6/2010 |
| JP | 2012-26429 A | 2/2012 |
| JP | 5146008 B2 | 2/2013 |
| JP | 2013-79920 A | 5/2013 |
| JP | 2014-157022 A | 8/2014 |
| JP | 5770993 B2 | 8/2015 |

OTHER PUBLICATIONS

International Search Report dated Feb. 7, 2017, in PCT/JP2016/087790 filed Dec. 19, 2016.

Uchiumi, M. et al., "Fatigue Strength of Rocket Pump Inducers", Turbomachinery, vol. 32, No. 1, 2004, pp. 51-59 (with Partial English Translation).

* cited by examiner (a)

(b)

(c)

ABNORMALITY DETERMINATION DEVICE AND ABNORMALITY DETERMINATION METHOD

TECHNICAL FIELD

The present disclosure relates to an abnormality determination device and an abnormality determination method.

BACKGROUND ART

Conventionally, a diagnostic system for predicting the lifetimes of components and the like is known. For example, Patent Literature 1 discloses a system for diagnosing a fatigue-damage degree of a vehicle to warn that the lifetime of a front side member is coming to the end by calculating the fatigue-damage degree of the front side member based on an input detected by a sensor.

CITATION LIST

Patent Literature

Patent Literature 1: Japanese Unexamined Patent Publication No. 2013-79920

SUMMARY

Technical Problem

In a flying object such as an unmanned spacecraft, if an inducer is damaged during a flight, a safety measure may be taken by destroying the airframe. However, in the case of a manned flying object, destroying the airframe is not acceptable. For this reason, it is required to detect an abnormality before the inducer is damaged and to safely stop the operation.

A use time for which an inducer is used in one flight is predetermined, and it is possible to safely operate unless the accumulated fatigue-damage degree of the inducer reaches the end of the lifetime of the inducer during the use time. However, the damage is accumulated in an inducer of a flying object due to various factors. For example, in the inducer, minute cavitation occurs randomly in a normal operation state, and this excitation force generates stress, which can lead to destruction of the inducer. In this manner, damage is not always accumulated at a certain rate.

In the system for diagnosing a fatigue-damage degree disclosed in Patent Literature 1, since the warning threshold is preset, warning cannot be made at an appropriate timing if the accumulation speed of the fatigue-damage degree changes. For example, when the operation can be safely performed, the inducer can be determined to be abnormal according to the setting of the warning threshold. In this manner, it is desired to improve the accuracy of abnormality determination of a component (inducer) used only for a predetermined use time per operation.

Solution to Problem

An abnormality determination device according to an aspect of the present disclosure is a device that determines an abnormality of an inducer used for a pump. The abnormality determination device includes a stress-response acquisition unit that acquires a stress response indicating a temporal change in stress applied to the inducer, an accumulated-fatigue-damage-degree calculation unit that calculates an accumulated fatigue-damage degree of the inducer based on the stress response, a lifetime-consumption-rate calculation unit that calculates a lifetime consumption rate that is a changing rate of the accumulated fatigue-damage degree with respect to time, and a determination unit that determines an abnormality of the inducer based on the accumulated fatigue-damage degree and the lifetime consumption rate. The inducer is used only for a predetermined use time per operation of the pump.

Advantageous Effects

According to the present disclosure, it is possible to improve the accuracy of abnormality determination.

DESCRIPTION OF EMBODIMENTS

[1] Outline of Embodiment

Figure 1:
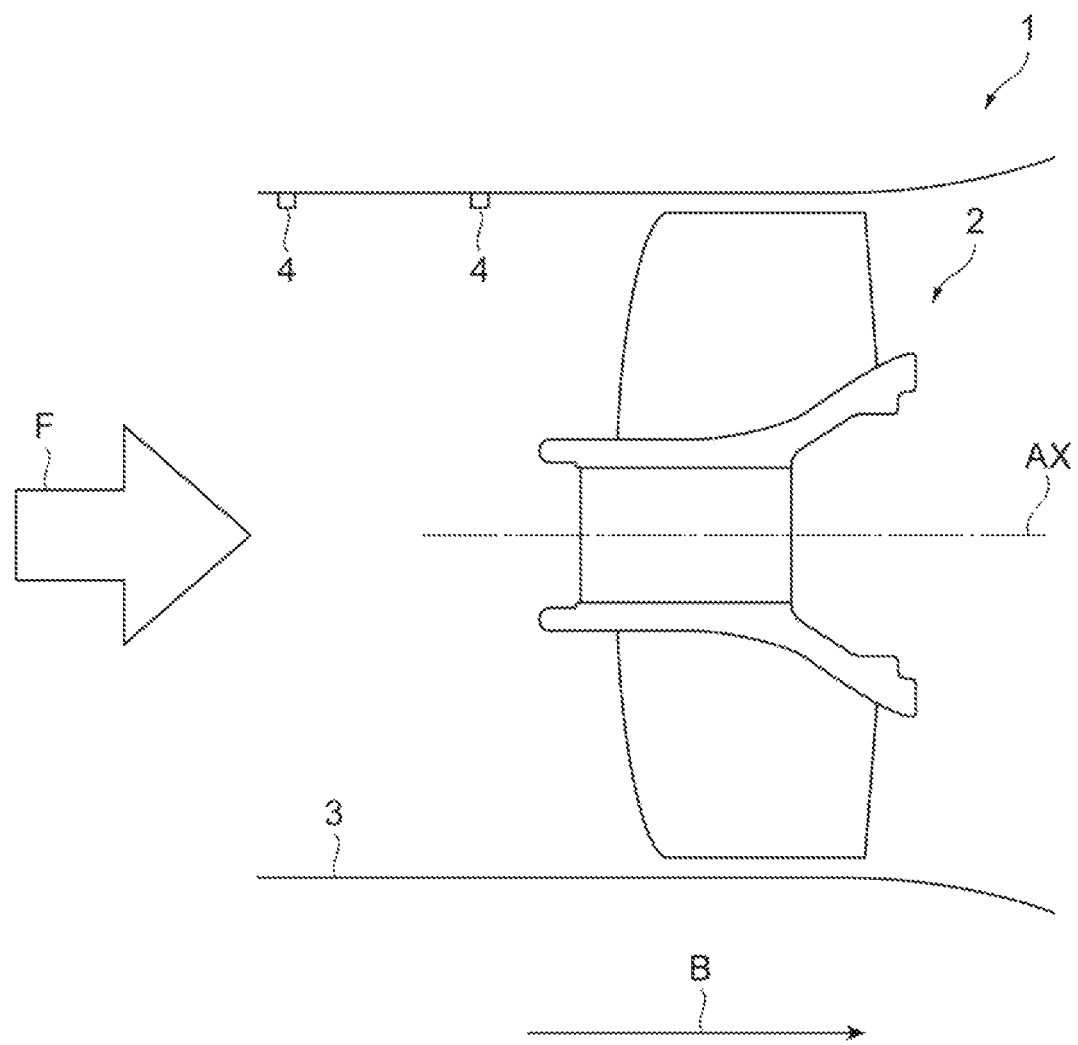
FIG. 1 is a diagram schematically showing an example of a determination target of an abnormality determination device according to the present embodiment.

An abnormality determination device according to an aspect of the present disclosure is a device that determines an abnormality of an inducer used for a pump. The abnormality determination device includes a stress-response acquisition unit that acquires a stress response indicating a temporal change in stress applied to the inducer, an accumulated-fatigue-damage-degree calculation unit that calculates an accumulated fatigue-damage degree of the inducer based on the stress response, a lifetime-consumption-rate calculation unit that calculates a lifetime consumption rate that is a changing rate of the accumulated fatigue-damage degree with respect to time, and a determination unit that determines an abnormality of the inducer based on the accumulated fatigue-damage degree and the lifetime consumption rate. The inducer is used only for a predetermined use time per operation of the pump.

An abnormality determination method according to another aspect of the present disclosure is an abnormality determination method performed by an abnormality determination device that determines an abnormality of an inducer used for a pump. The abnormality determination method includes the steps of acquiring a stress response indicating a temporal change in stress applied to the inducer, calculating an accumulated fatigue-damage degree of the inducer based on the stress response, calculating a lifetime consumption rate that is a changing rate of the accumulated fatigue-damage degree with respect to time, and determining an abnormality of the inducer based on the accumulated fatigue-damage degree and the lifetime consumption rate. The inducer is used only for a predetermined use time per operation of the pump.

In the abnormality determination device and the abnormality determination method, the accumulated fatigue-damage degree of the inducer is calculated based on the stress response applied to the inducer, and the lifetime consumption rate that is a changing rate of the accumulated fatigue-damage degree with respect to time is calculated. Then, based on the accumulated fatigue-damage degree and the lifetime consumption rate, an abnormality of the inducer is determined. In this manner, by taking not only the accumulated fatigue-damage degree but also the lifetime consumption rate into consideration, it is possible to determine an abnormality of the inducer according to the accumulation speed (lifetime consumption rate) of the accumulated fatigue-damage degree. As a result, it is possible to improve the accuracy of abnormality determination of the inducer.

The abnormality determination device may further include a pressure acquisition unit that acquires pressure at an input side of the inducer. The stress-response acquisition unit may acquire the stress response based on a pressure response indicating a temporal change in the pressure. In this case, when the stress applied to the inducer cannot be directly measured, it is possible to indirectly acquire the stress response of the stress applied to the inducer by measuring the pressure at the input side of the inducer.

The determination unit may predict, based on the accumulated fatigue-damage degree and the lifetime consumption rate, whether the accumulated fatigue-damage degree exceeds a lifetime limit defining a limit of a damage degree of the inducer during the operation, and may determine that the inducer is abnormal when predicting that the accumulated fatigue-damage degree exceeds the lifetime limit during the operation. If the accumulated fatigue-damage degree exceeds the lifetime limit of the inducer during the operation, the inducer can be damaged. Thus, when it is predicted that the accumulated fatigue-damage degree exceeds the lifetime limit of the inducer during the operation, the inducer is determined to be abnormal. As a result, it is possible to determine an abnormality of the inducer before the inducer is damaged.

The determination unit may calculate a remaining lifetime at a time when a predetermined elapsed time has elapsed from a start time of the operation by subtracting the accumulated fatigue-damage degree from the lifetime limit, may calculate a remaining time until the accumulated fatigue-damage degree reaches the lifetime limit by dividing the remaining lifetime by the lifetime consumption rate, and may predict, based on the remaining time and the elapsed time, whether the accumulated fatigue-damage degree exceeds the lifetime limit during the operation. In this case, it is predicted whether the accumulated fatigue-damage degree exceeds the lifetime limit during the operation based on the assumption that the remaining lifetime is consumed at the lifetime consumption rate at the time when the elapsed time has elapsed. Thus, when the lifetime consumption rate is changed due to some factor during the operation, it is possible to determine an abnormality of the inducer according to the lifetime consumption rate. As a result, it is possible to improve the accuracy of abnormality determination of the inducer.

The determination unit may predict that the accumulated fatigue-damage degree exceeds the lifetime limit during the operation when the sum of the remaining time and the elapsed time is shorter than the use time. Whether the accumulated fatigue-damage degree exceeds the lifetime limit during the operation is determined by the magnitude relation between the sum of the remaining time and the elapsed time, and the use time. Thus, it is possible to improve the accuracy of the prediction as to whether the accumulated fatigue-damage degree exceeds the lifetime limit during the operation, and to improve the accuracy of the abnormality determination of the inducer.

The determination unit may determine that the inducer is abnormal when the lifetime consumption rate is greater than a predetermined reference value. When the lifetime consumption rate is greater than the assumed reference value, some kind of abnormality could have occurred in the inducer. Thus, by determining that the inducer is abnormal when the lifetime consumption rate is greater than the reference value, it is possible to determine an abnormality of the inducer before the inducer is damaged. As a result, it is possible to improve the accuracy of abnormality determination of the inducer.

[2] Exemplification of Embodiment

Hereinafter, an embodiment of the present disclosure is described with reference to the drawings. In the description of the drawings, identical elements are denoted by the same reference signs, and overlapped descriptions are omitted.

FIG. 1 is a diagram schematically showing an example of a determination target of an abnormality determination device according to the present embodiment. As shown in FIG. 1, an inducer 2 provided in a turbo pump of a rocket 1 is a determination target. The rocket 1 is a device that obtains propulsive power from reaction by injection, and is a reusable rocket that can be used repeatedly. The rocket 1 is, for example, a liquid rocket. In the rocket engine of the rocket 1, liquid fuel F such as liquid hydrogen and liquid oxygen is used as fuel. The rocket 1 is provided with a turbo pump for supplying the high-pressure liquid fuel F. The inducer 2 is a rotating body provided on the input side of the turbo pump in order to improve the suction performance of the turbo pump. The inducer 2 is provided in a pipe 3 extending in a direction B and rotates about a rotation axis AX extending in the extending direction of the pipe 3. The inducer 2 sucks the liquid fuel flowing through the pipe 3 and pressurizes the liquid fuel F.

Since the inducer 2 sucks the low-pressure liquid fuel F, when the pressure of the liquid fuel F becomes lower than the saturated vapor pressure of the liquid fuel F, the liquid fuel F boils and many small bubbles are generated. Then, when the pressure around the bubbles becomes higher than the saturated vapor pressure of the liquid fuel F, the bubbles disappear. At this moment, since the liquid fuel. F around the bubble collides in the vicinity of the center of the bubbles, a pressure wave is generated, and which generates vibration. In this manner, it is known that cavitation occurs in the liquid fuel F, and stress is applied to the inducer 2 by the cavitation. Stress due to various factors besides cavitation is applied to the inducer 2. As the stress is accumulated in the inducer 2, this can damage the inducer 2. Note that, the inducer 2 is used for a predetermined use time X per flight. Especially an inducer blade in the inducer 2 may be a determination target, but in the following description, it is described that the inducer 2 is the determination target.

A pressure sensor 4 is provided on the inner surface of the pipe 3. The pressure sensor 4 is disposed, for example, at the substantially same position as the input side front end of the inducer 2 or at an upstream position of the liquid fuel F separated by a predetermined distance from the input side front end of the inducer 2 in the direction B along the rotation axis AX of the inducer 2. The pressure sensor 4 measures the pressure around the inducer 2 (pressure at the input side), and transmits the measured pressure to an abnormality determination device 10.

Figure 2:
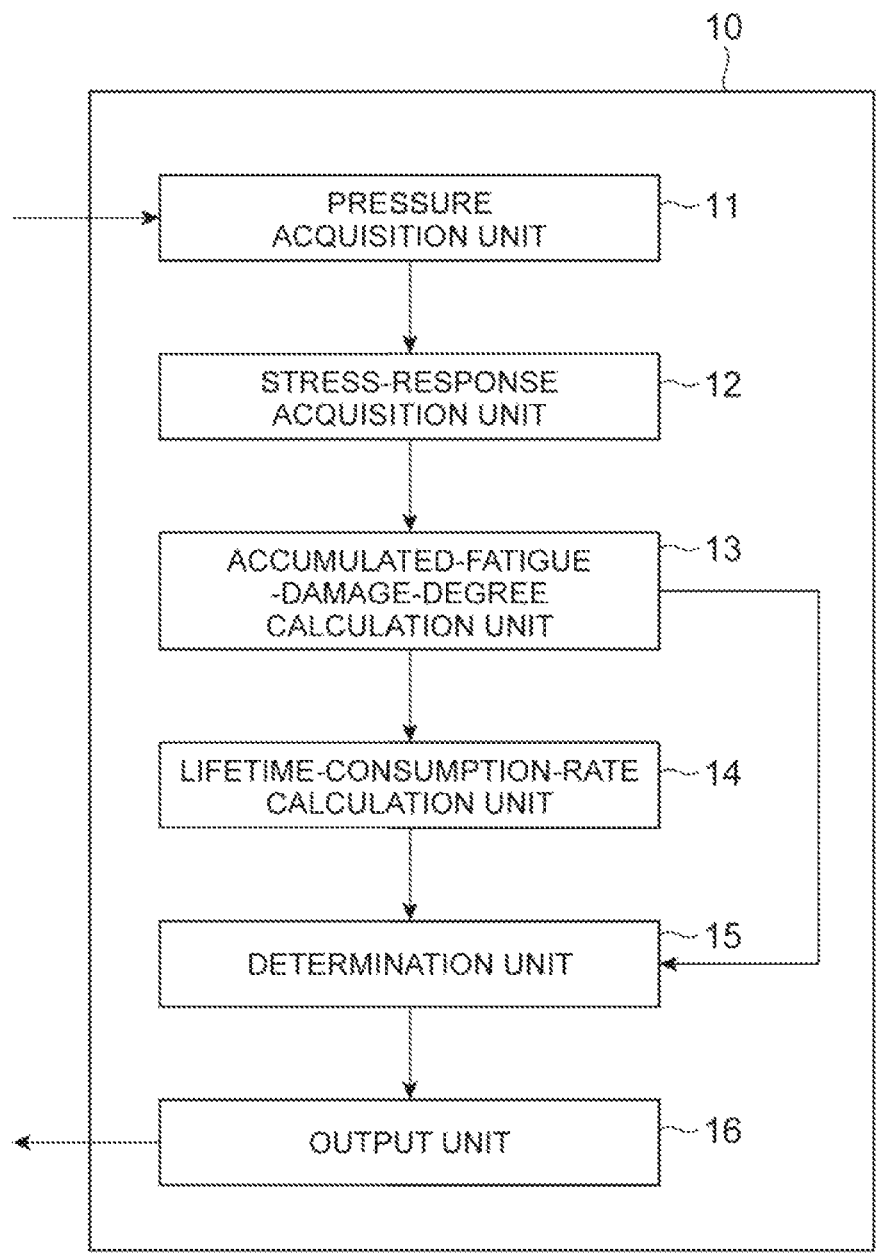
FIG. 2 is a functional block diagram of the abnormality determination device according to the present embodiment.

FIG. 2 is a functional block diagram of the abnormality determination device according to the present embodiment. The abnormality determination device 10 shown in FIG. 2 is a device that determines an abnormality of the inducer 2. The abnormality determination device 10 determines an abnormality of the inducer 2 based on the accumulated fatigue-damage degree of the inducer 2 of the rocket 1.

Figure 3:
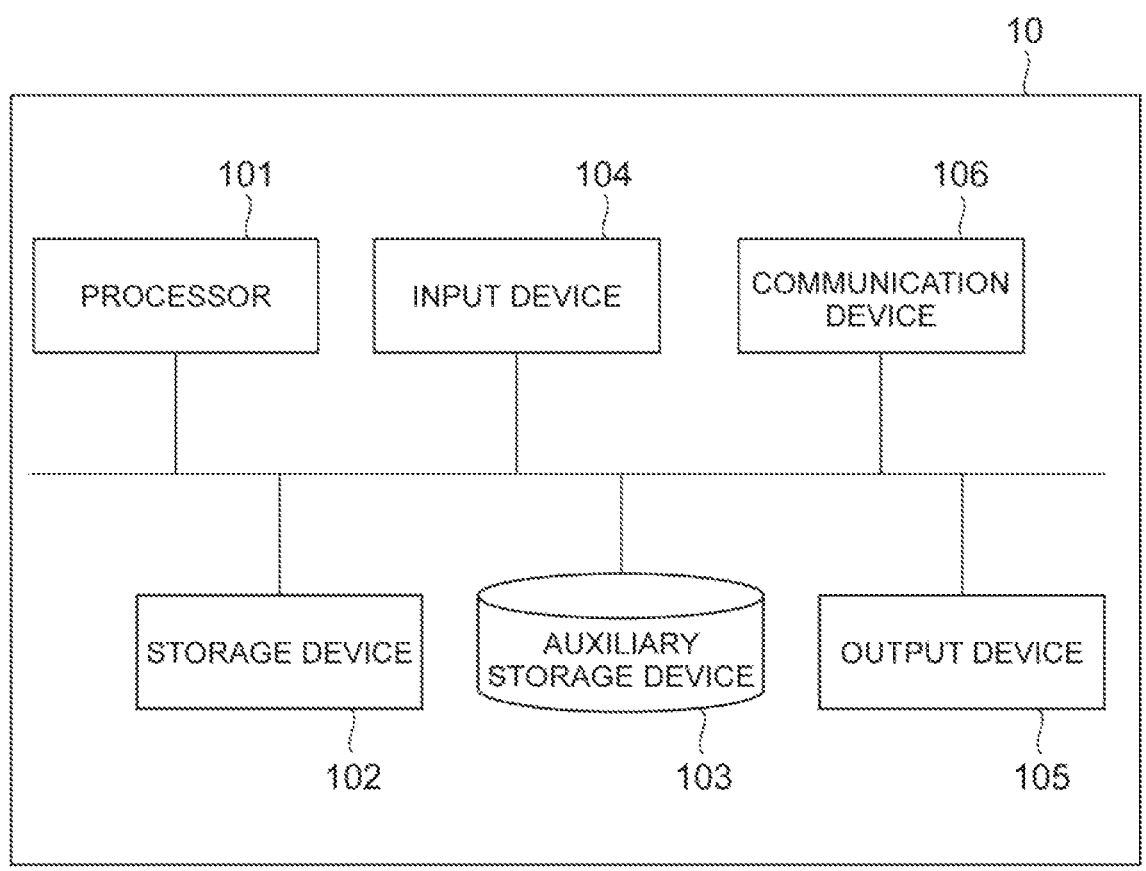
FIG. 3 is a hardware configuration diagram of the abnormality determination device in FIG. 2.

FIG. 3 is a hardware configuration diagram of the abnormality determination device 10. As shown in FIG. 3, the abnormality determination device 10 can be constituted physically as a computer including hardware of one or more processors 101, a storage device 102 which is a main storage device such as a random access memory (RAM) or a read only memory (ROM), an auxiliary storage device 103 such as a hard disk device, an input device 104 such as a keyboard, an output device 105 such as a display; and a communication device 106 which is a data transmission/reception device, and the like. Each function of the abnormality determination device 10 shown in FIG. 2 is implemented by loading one or more predetermined computer programs in hardware such as one or more processors 101 and the storage device 102 to operate the hardware under the control of one or more processors. 101, and by reading and writing data in the storage device 102 and the auxiliary storage device 103.

Returning to FIG. 2, the details of the abnormality determination device 10 is described. The abnormality determination device 10 includes a pressure acquisition unit 11, a stress-response acquisition unit 12, an accumulated-fatigue-damage-degree calculation unit 13, a lifetime-consumption-rate calculation unit 14, a determination unit 15, and an output unit 16.

The pressure acquisition unit 11 functions as pressure acquisition means for acquiring the pressure at the input side of the inducer 2. The pressure acquisition unit 11 acquires the pressure measured by the pressure sensor 4. The pressure acquisition unit 11 samples the pressure measured by the pressure sensor 4 at sampling intervals $\Delta T$ of, for example, about 10 kHz to obtain a pressure response. The pressure response is a pressure sequence indicating a temporal change in the pressure at the input side of the inducer 2 and arranging the pressure at the input side of the inducer 2 at predetermined time intervals in time series. The pressure acquisition unit 11 outputs the pressure response to the stress-response acquisition unit 12.

The stress-response acquisition unit 12 functions as stress-response acquisition means for acquiring a stress response based on the pressure response acquired by the pressure acquisition unit 11. The stress response is a stress sequence indicating a temporal change in the stress applied to the inducer 2, and arranging the stress applied to the inducer 2 at predetermined time intervals in time series. The stress-response acquisition unit 12 converts the pressure response into the stress response using a preset transfer function. The transfer function is a function that defines the relation between the pressure measured by the pressure sensor 4 and the stress applied to the inducer 2. For example, a distortion sensor is provided in the inducer 2, and a function defining the relation between the pressure measured by the pressure sensor 4 and the distortion of the inducer 2 measured by the distortion sensor is obtained in advance as the transfer function. The stress-response acquisition unit 12 outputs the acquired stress response to the accumulated-fatigue-damage-degree calculation unit 13.

The accumulated-fatigue-damage-degree calculation unit 13 functions as accumulated-fatigue-damage-degree calculation means for calculating the accumulated fatigue-damage degree of the inducer 2 based on the stress response acquired by the stress-response acquisition unit 12. The accumulated-fatigue-damage-degree calculation unit 13 decomposes the stress response into sets of stress amplitude and average stress using, for example, a rainflow-counting algorithm.

Figure 4:
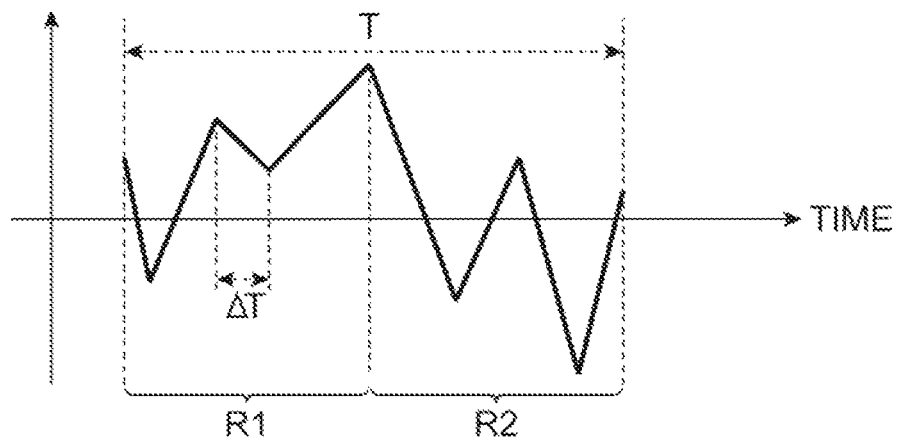
FIGS. 4(a) to 4(c) are diagrams for explaining decomposition of a stress response using a rainflow-counting algorithm.
Figure 4:
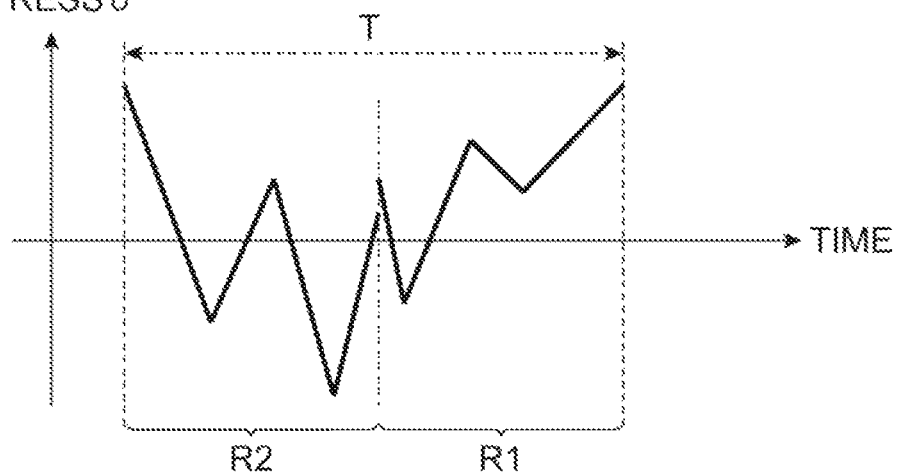
Figure 4:
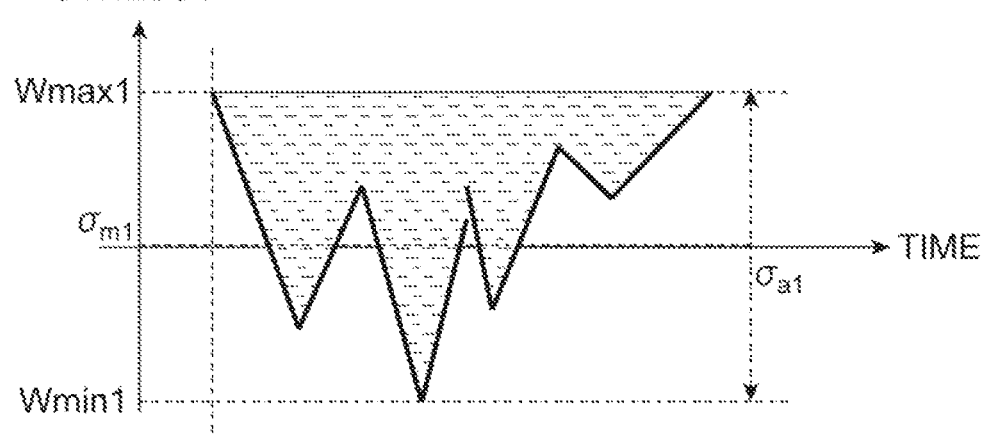
Figure 5:
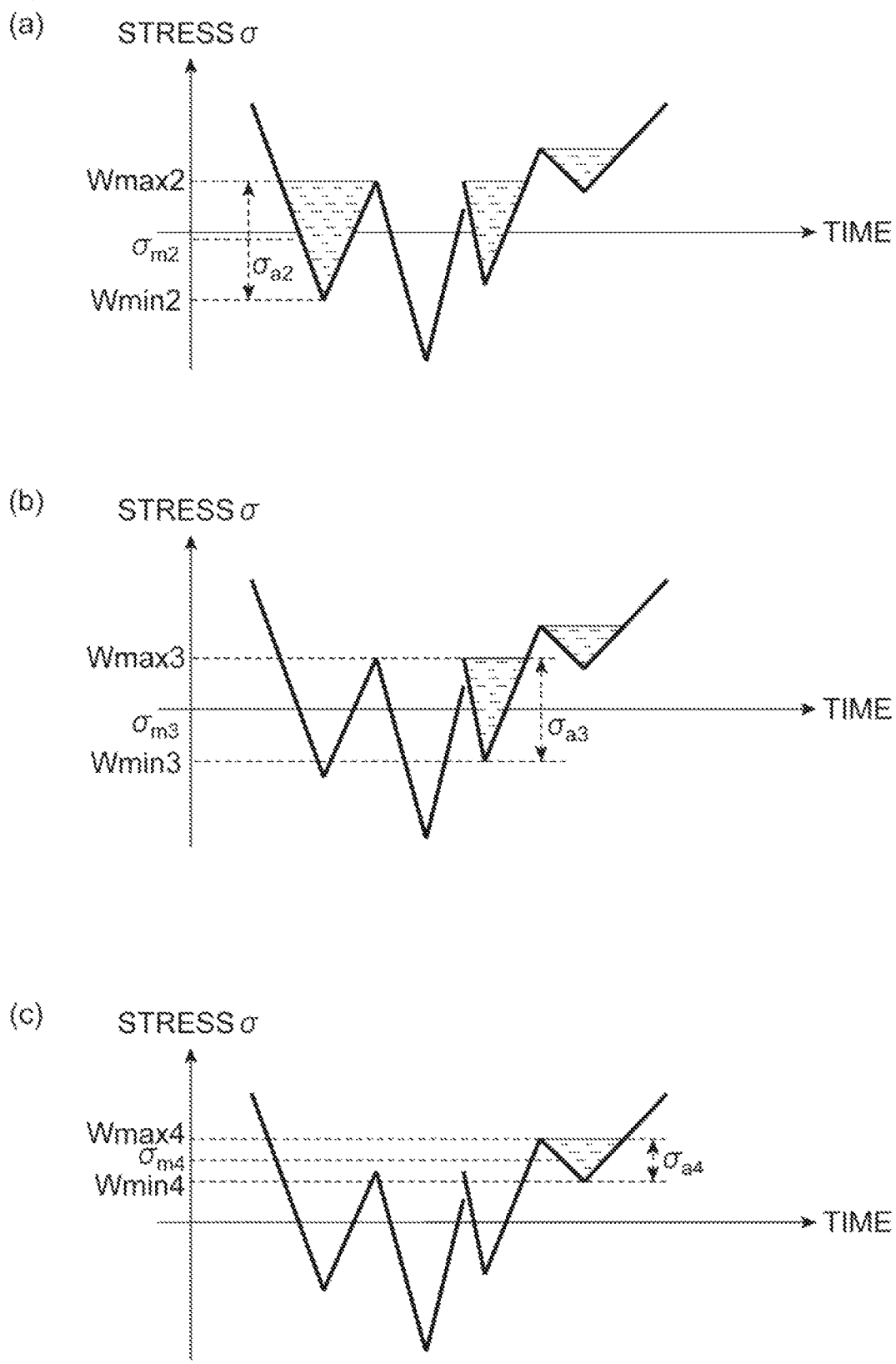
FIGS. 5(a) to 5(c) are diagrams for explaining decomposition of the stress response using the rainflow-counting algorithm.

FIGS. 4 and 5 are diagrams for explaining the decomposition of the stress response using the rainflow-counting algorithm. In FIGS. 4(*a*) to 4(*c*) and 5(*a*) to 5(*c*), the horizontal axis indicates time (axis) and the vertical axis indicates stress a. As shown in FIG. 4(*a*), the accumulated-fatigue-damage-degree calculation unit 13 extracts an evaluation target from the stress response in a sampling section. T. The sampling section T is predetermined based on the minimum cycle in which stress response is evaluated. In addition, a sampling interval $\Delta T$ is predetermined based on the maximum cycle in which stress response is evaluated. The sampling section. T is, for example, about several seconds. The accumulated-fatigue-damage-degree calculation unit 13 extracts the maximum value and the minimum value of the evaluation target, and divides the evaluation target into the first half portion R1 and the second half portion R2 of the horizontal axis by setting the maximum value as the boundary.

Then, as shown in FIG. 4(*b*), the accumulated-fatigue-damage-degree calculation unit 13 connects the first half portion R1 behind the second half portion R2 to generate a container in a shape having the maximum values at both ends. As shown in FIG. 4(*c*), the accumulated-fatigue-damage-degree calculation unit 13 virtually fills the container with water. The accumulated-fatigue-damage-degree calculation unit 13 calculates the difference between the maximum water level point Wmax1 and the minimum water level point Wmin1 as the stress amplitude $\sigma_{a1}$, and calculates an intermediate value between the maximum water level point Wmax1 and the minimum water level point Wmin1 as the average stress $\sigma_{m1}$. The accumulated-fatigue-damage-degree calculation unit 13 assigns a new number i to a set in, for example, ascending order each time a different set is obtained by the decomposition.

Next, as shown in FIG. 5(*a*), the accumulated-fatigue-damage-degree calculation unit 13 drains the water from the minimum water level point Wmin1 and determines the new minimum water level point Wmin2. The accumulated-fatigue-damage-degree calculation unit 13 calculates the stress amplitude $\sigma_{a2}$ and the average stress $\sigma_{m2}$ using the maximum water level point Wmax2 of the storage of the water corresponding to the minimum water level point Wmin2 and the minimum water level point Wmin2. Similarly, as shown in FIG. 5(*b*), the accumulated-fatigue-damage-degree calculation unit 13 drains the water from the minimum water level point Wmin2, determines the new minimum water level point Wmin3, and calculates the stress amplitude $\sigma_{a3}$ and the average stress $\sigma_{m3}$ using the maximum water level point Wmax3 and the minimum water level point. Wmin3. Similarly, as shown in FIG. 5(*c*), the accumulated-fatigue-damage-degree calculation unit 13 drains the water from the minimum water level point Wmin3, determines the new minimum water level point Wmin4, and calculates the stress amplitude $\sigma_{a4}$ and the average stress $\sigma_{m4}$ using the maximum water level point Wmax4 and the minimum water level point Wmin4.

In this manner, the accumulated-fatigue-damage-degree calculation unit 13 decomposes the stress response of the evaluation target into a plurality of sets ($\sigma_{ai}$, $\sigma_{mi}$). The accumulated-fatigue-damage-degree calculation unit 13 counts the number of times $n_i$ each set is obtained. In this example, each of the number of times $n_1$ to $n_4$ is 1 in the decomposition shown in FIGS. 4 and 5. Then, the accumulated-fatigue-damage-degree calculation unit 13 performs the similar processing for the next sampling section T. When a different set is obtained by further decomposition, the accumulated-fatigue-damage-degree calculation unit 13 assigns the number i to the set as a sequential number of the sets obtained by the previous decomposition.

The accumulated-fatigue-damage-degree calculation unit 13 calculates, for each of k (an integer of 1 or more) sets ($\sigma_{ai}$, $\sigma_{mi}$), an equivalent stress amplitude $S_{si}$ using the modified Goodman diagram expressed by Formula (1). The equivalent stress amplitude $S_{si}$ is variable stress modified in consideration of the influence on fatigue strength when there is an average stress. A tensile strength $S_b$, is the tensile strength of the blade material of the inducer 2, which is a fixed value predetermined by the material of the blade. The number i is an integer of 1 or more and k or less.

[Formula 1]

$$S_{si} = \frac{\sigma_{ai}}{1 - \frac{\sigma_{mi}}{S_b}} \quad (1)$$

Figure 6:
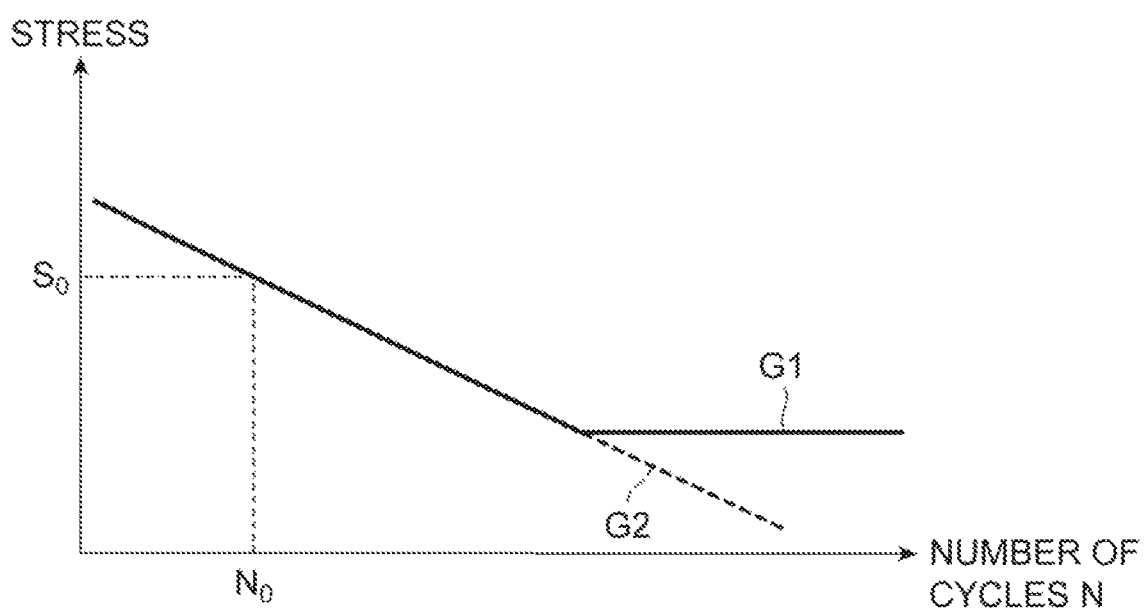
FIG. 6 is a diagram showing an S-N curve of a blade material of an inducer.

FIG. 6 is a diagram showing an S-N curve of the blade material of the inducer 2. In FIG. 6, the horizontal axis indicates the number of cycles N, and the vertical axis indicates the stress amplitude. The S-N curve indicates the number of cycles N at which the inducer 2 is damaged when only stress of each stress amplitude is applied. This S-N curve is determined based on the fatigue test result of the blade material of the inducer 2. The graph G1 in FIG. 6 shows the Minor's rule and the graph G2 shows the modified Minor's rule.

Based on the S-N curve of the blade material of the inducer 2, the accumulated-fatigue-damage-degree calculation unit 13 calculates, with Formula (2), the number of cycles $N_i$ at which the inducer 2 is damaged when only the stress of the equivalent stress amplitude $S_{si}$ is applied to the inducer 2. The reference number of cycles $N_0$ is the number of cycles at which the inducer 2 is damaged when only the stress of a reference stress amplitude $S_0$ is applied to the inducer 2. The inclination b is the inclination of the S-N curve. In consideration of the stress concentration effect due to alternate stress, the value of the inclination b may be twice the inclination of the S-N curve.

[Formula 2]

$$N_i = N_0 \left(\frac{S_0}{S_{si}}\right)^b \quad (2)$$

When the modified Minor's rule is used, an accumulated fatigue-damage degree $\psi(t)$ is expressed by Formula (3). The accumulated fatigue-damage degree $\psi(t)$ is the accumulated fatigue-damage degree from the start time of the n-th flight to the time when an elapsed time t has elapsed. Note that, the elapsed time t is the elapsed time from the start time of the n-th flight, and uses the sampling interval. $\Delta T$ as a unit time. That is, each time the elapsed time from the start time of the n-th flight increases by the sampling interval $\Delta T$, "1" is added to the elapsed time t. In the following description, a time when the elapsed time t has elapsed from the start time of the n-th flight may be simply referred to as an "elapsed time t".

[Formula 3]

$$\psi(t) = \sum_{i=1}^{k} \frac{n_i}{N_i} \quad (3)$$

The accumulated-fatigue-damage-degree calculation unit 13 calculates the accumulated fatigue-damage degree $\psi(t)$ with. Formula (3). The accumulated-fatigue-damage-degree calculation unit 13 calculates the accumulated fatigue-damage degree $\psi(t)$ at each sampling interval $\Delta T$ and outputs the calculated accumulated fatigue-damage degree $\psi(t)$ to the lifetime-consumption-rate calculation unit 14 and the determination unit 15.

The lifetime-consumption-rate calculation unit 14 functions as lifetime-consumption-rate calculation means for calculating a lifetime consumption rate $\psi'(t)$ that is a changing rate of the accumulated fatigue-damage degree $\psi(t)$ with respect to time. The lifetime-consumption-rate calculation unit 14 calculates the difference $\Delta \psi$ of the accumulated fatigue-damage degrees $\psi(t)$ received from the accumulated-fatigue-damage-degree calculation unit 13 at each sampling interval $\Delta T$. That is, the lifetime-consumption-rate calculation unit 14 calculates the difference $\Delta \psi(t)$ at the time when the elapsed time t has elapsed by subtracting the accumulated fatigue-damage degree $\psi(t-1)$ from the accumulated fatigue-damage degree $\psi(1)$.

As shown in Formula (4), the lifetime-consumption-rate calculation unit 14 calculates the lifetime consumption rate $\psi'(t)$ at the elapsed time t by dividing the difference $\Delta \psi(t)$ by the sampling interval $\Delta T$. The lifetime-consumption-rate calculation unit 14 outputs the calculated lifetime consumption rate $\psi'(t)$ to the determination unit 15.

[Formula 4]

$$\psi'(t) = \frac{\Delta \psi(t)}{\Delta T} \quad (4)$$

The determination unit 15 functions as determination means for determining an abnormality of the inducer 2 based on the accumulated fatigue-damage degree w and the lifetime consumption rate $\psi'/(t)$ of the inducer 2. Here, with reference to FIG. 7, the outline of the abnormality determination of the inducer 2 by the determination unit 15 is described.

Figure 7:
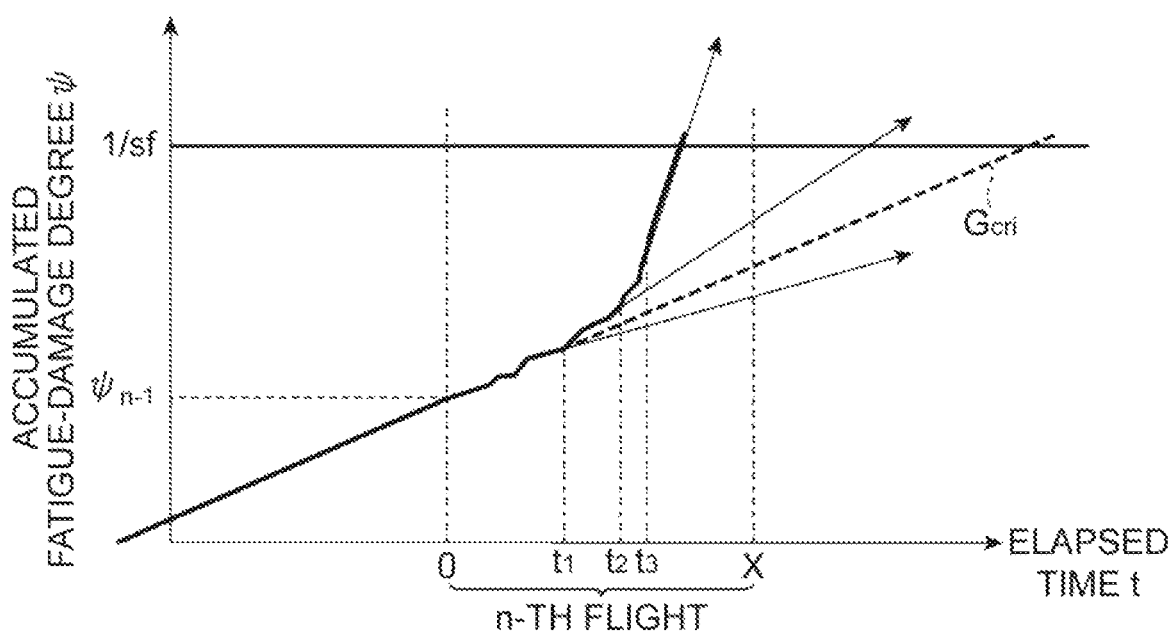
FIG. 7 is a diagram for explaining abnormality determination of an inducer.

FIG. 7 is a diagram for explaining the abnormality determination of the inducer 2. In FIG. 7, the horizontal axis indicates time and the vertical axis indicates the accumulated fatigue-damage degree $\psi$. The value obtained by setting the lifetime of the inducer 2 to "1" and dividing the lifetime by a lifetime safety factor sf is a lifetime limit (1/sf). The lifetime safety factor sf is a value for setting a margin for the lifetime of the inducer 2, and is, for example, about 1 to 5. That is, the lifetime limit (1/sf) is a value that defines the limit of the acceptable damage degree of the inducer 2. In addition, the inducer 2 operates only for the use time X per flight of the rocket 1. At the start time of the n-th flight, the accumulated fatigue-damage degree $\psi_{n-1}$ is accumulated by the flights up to the (n−1)th flight. In this case, the remaining lifetime is, for example, $(1/sf-\psi_{n-1})$.

At the n-th flight, the inducer 2 is determined to be normal when the accumulated fatigue-damage degree $\psi$ does not exceed the lifetime limit (1/sf), and the inducer 2 is determined to be abnormal when the accumulated fatigue-damage degree ter exceeds the lifetime limit (1/sf). That is, the determination unit 15 predicts, based on the accumulated fatigue-damage degree $\psi(t)$ and the lifetime consumption rate $\psi'(t)$, whether the accumulated fatigue-damage degree ter exceeds the lifetime limit (1/sf) during the n-th flight. The determination unit 15 determines that the inducer 2 is abnormal when predicting that the accumulated fatigue-damage degree $\psi$ exceeds the lifetime limit (list) during the n-th flight. The determination unit 15 determines that the inducer 2 is normal when predicting that the accumulated fatigue-damage degree does not exceed the lifetime limit, (1/sf) during the n-th flight. Specifically, on the assumption that the lifetime of the inducer 2 is continuously consumed at the lifetime consumption rate $\psi'(t)$ at the elapsed time t, the determination unit 15 performs the abnormality determination of the inducer 2 based on whether the accumulated fatigue-damage degree v exceeds the lifetime limit (1/sf) during the n-th flight.

More specifically, the determination unit 15 determines the abnormality of the inducer 2 using a determination value D(t) shown in Formula (5).

[Formula 5]

$$D(t) = \frac{\frac{1}{sf} - (\psi_{n-1} + \psi_n(t))}{\psi'(t)} + t - X \tag{5}$$

The value obtained by adding the accumulated fatigue-damage degree $\psi_n(t)$ from the start time of the n-th flight to the time when the elapsed time t has elapsed to the accumulated fatigue-damage degree $\psi_{n-1}$ up to the (n−1)th flight of the rocket 1 is the accumulated fatigue-damage degree from the start time of the first flight to the elapsed time t in the n-th flight. The determination unit 15 calculates the remaining lifetime based on the lifetime limit (1/sf) and the accumulated fatigue-damage degree $\psi$. For example, the determination unit 15 subtracts the accumulated fatigue-damage degree ii from the lifetime limit (1/sf), and determines the subtraction result as the remaining lifetime at the elapsed time t. That is, as shown by the numerators of the first term on the right side of Formula (5), the determination unit 15 calculates the remaining lifetime at the elapsed time t.

The determination unit 15 calculates a remaining time tr(t) based on the remaining lifetime and the lifetime consumption rate $\psi'(t)$. For example, as shown in the first term on the right side of Formula (5), the determination unit 15 calculates the remaining time tr(t) by dividing the remaining lifetime by the lifetime consumption rate $\psi'(t)$. The remaining time tr(t) is the time until the accumulated fatigue-damage degree $\psi$ reaches the lifetime limit (Use when the lifetime of the inducer 2 is continuously consumed at the lifetime consumption rate $\psi'(t)$. The determination unit 15 predicts, based on the remaining time tr(t) and the elapsed time t, whether the accumulated fatigue-damage degree $\psi$ exceeds the lifetime limit (1/sf) during the n-th flight. Specifically, the determination unit 15 predicts that the accumulated fatigue-damage degree $\psi$ exceeds the lifetime limit (1/sf) during the n-th flight when the sum of the remaining time tr(t) and the elapsed time t is shorter than the use time X, and that the accumulated fatigue-damage degree $\psi$ does not exceed the lifetime limit (1/sf) during the n-th flight when the sum of the remaining time tr(t) and the elapsed time t is equal to or longer than the use time X.

That is, as shown in Formula (6), when the determination value D(t) is a negative value, the determination unit 15 predicts that the accumulated fatigue-damage degree $\psi$ exceeds the lifetime limit (1/sf) during the n-th flight, and determines that the inducer 2 is abnormal. When the determination value D(t) is equal to or greater than 0, the determination unit 15 predicts that the accumulated fatigue-damage degree $\psi$ does not exceed the lifetime limit (1/sf) during the n-th and determines that the inducer 2 is normal.

[Formula 6]

$$D(t)<0 \tag{6}$$

As shown in FIG. 7, the inducer 2 may be determined to be abnormal when the lifetime consumption rate $\psi'(t)$ is greater than a reference value $\psi'_{cri}$ which is the inclination of the graph $G_{cri}$, and to be normal when the lifetime consumption rate $\psi'(t)$ is equal to or less than the reference value $\psi'_{cri}$. That is as shown in Formula (7), the determination unit 15 may determine that the inducer 2 is abnormal when the lifetime consumption rate $\psi'(t)$ is greater than the predetermined reference value $\psi'_{cri}$, and that the inducer 2 is normal when the lifetime consumption rate $\psi'(t)$ is equal to or less than the predetermined reference value $\psi'_{cri}$. The reference value $\psi'_{cri}$ is preset by experiments or the like.

[Formula 7]

$$\psi'(t)>\psi'_{cri} \tag{7}$$

The determination unit 15 outputs a determination result indicating whether the inducer 2 is abnormal or normal to the output unit 16.

The output unit 16 functions as output means for outputting the determination result determined by the determination unit 15. The output unit 16 outputs the determination result to the output device 105 (see FIG. 3) such as a display. When the determination result indicates the abnormality, the output unit 16 may transmit a stop instruction to the control unit of the rocket 1 so as to safely stop the operation of the rocket 1.

Figure 8:
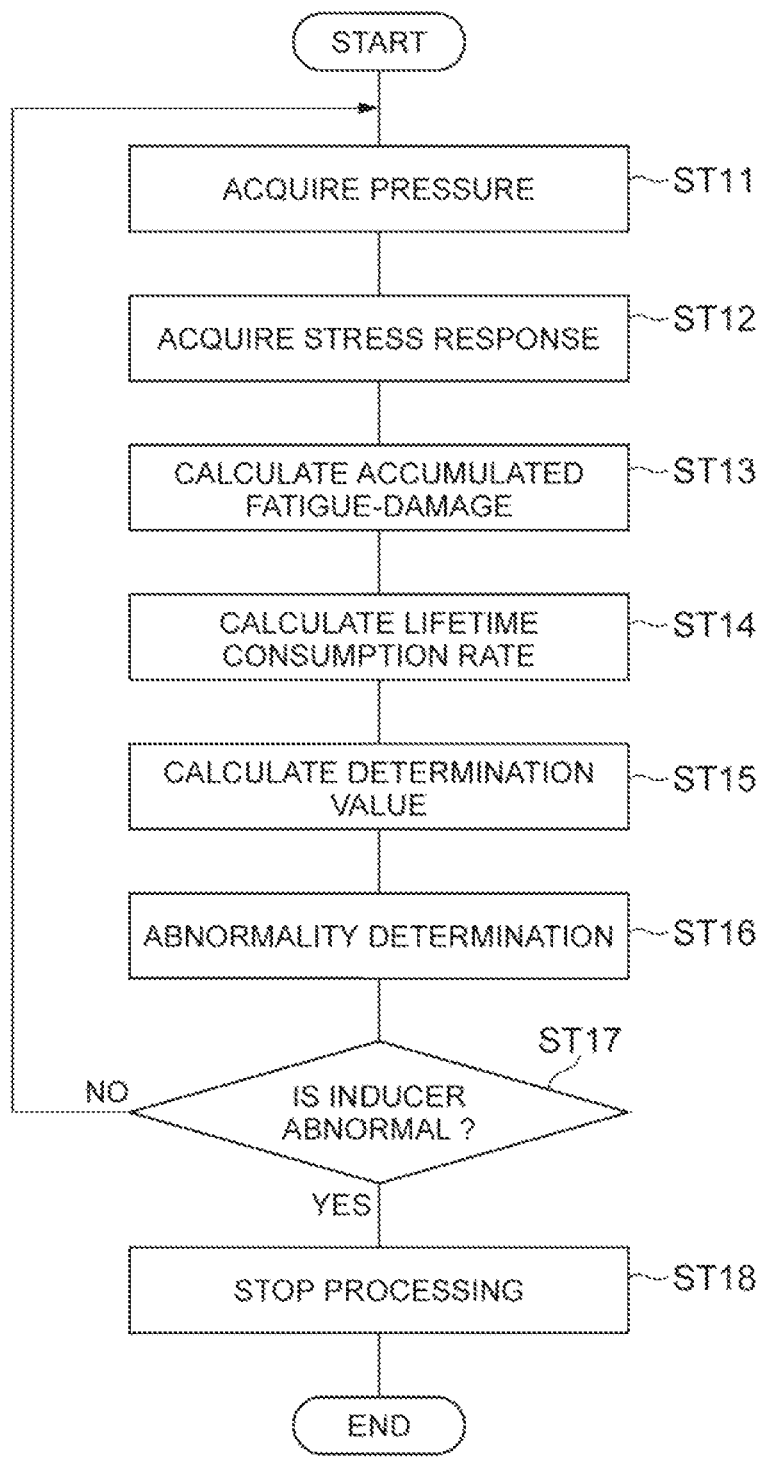
FIG. 8 is a flowchart showing an example of an abnormality determination method performed by the abnormality determination device in FIG. 2.

Next, an example of an abnormality determination method performed by the abnormality determination device 10 is described. FIG. 8 is a flowchart showing an example of the abnormality determination method performed by the abnormality determination device 10. A series of processing shown in FIG. 8 is started at the timing when the n-th flight of the rocket 1 is started.

First, the pressure acquisition unit 11 acquires the pressure measured by the pressure sensor 4 as the pressure at the input side of the inducer 2 (step ST11). Specifically, the pressure acquisition unit 11 acquires a pressure response of the pressure at the input side of the inducer 2 by sampling the pressure measured by the pressure sensor 4. Then, the pressure acquisition unit 11 outputs the pressure response to the stress-response acquisition unit 12.

Then, the stress-response acquisition unit 12 acquires a stress response based on the pressure response (step ST12). Specifically, the stress-response acquisition unit 12 converts the pressure response into the stress response using a preset transfer function. Then, The stress-response acquisition unit 12 outputs the stress response to the accumulated-fatigue-damage-degree calculation unit 13.

Subsequently, the accumulated-fatigue-damage-degree calculation unit 13 calculates an accumulated fatigue-damage degree $\psi(t)$ of the inducer 2 based on the stress response acquired by the stress-response acquisition unit 12 (step ST13). Specifically, the accumulated-fatigue-damage-degree calculation unit 13 decomposes the stress response into a plurality of sets ($\sigma_{ai}$, $\sigma_{mi}$) using, for example, a rainflow-counting algorithm. Then, the accumulated-fatigue-damage-degree calculation unit 13 calculates, for each set ($\sigma_{ai}$, $\sigma_{mi}$), an equivalent stress amplitude $S_{si}$ with Formula (1). Then, the accumulated-fatigue-damage-degree calculation unit 13 calculates, with Formula (2), the number of cycles $N_i$ at which the inducer 2 is damaged when only the stress of the equivalent stress amplitude $S_{si}$ is applied to the inducer 2. Then, the accumulated-fatigue-damage-degree calculation unit 13 calculates the accumulated fatigue-damage degree $\psi(t)$ with Formula (3) and outputs it to the lifetime-consumption-rate calculation unit 14 and the determination unit 15.

Subsequently, the lifetime-consumption-rate calculation unit 14 calculates a lifetime consumption rate $\psi'(t)$ (step ST14). Specifically, the lifetime-consumption-rate calculation unit 14 calculates the difference $\Delta\psi(t)$ between the accumulated fatigue-damage degree $\psi(t)$ and the accumulated fatigue-damage degree $\psi(t-1)$. Then, the lifetime-consumption-rate calculation unit 14 calculates the lifetime consumption rate $\psi'(t)$ with Formula (4), and outputs the lifetime consumption rate $\psi'(t)$ to the determination unit 15.

Subsequently, the determination unit 15 calculates a determination value $D(t)$ with Formula (5) (Step ST15). Then, the determination unit 15 performs abnormality determination of the inducer 2 (step ST16). Specifically, as shown in Formula (6), when the determination value $D(t)$ is a negative value, the determination unit 15 predicts that the accumulated fatigue-damage degree $\psi$ exceeds the lifetime limit (1/sf) during the n-th flight, and determines that the inducer 2 is abnormal. When the determination value $D(t)$ is equal to or greater than 0, the determination unit 15 predicts that the accumulated fatigue-damage degree $\psi$ does not exceed the lifetime limit (1/sf) during the n-th flight, and determines that the inducer 2 is normal. Alternatively, as shown in Formula (7), the determination unit 15 may determine that the inducer 2 is abnormal when the lifetime consumption rate $\psi'(t)$ is greater than the reference value $\psi'_{cri}$, and that the inducer 2 is normal when the lifetime consumption rate $\psi'(t)$ is equal to or less than the reference value $\psi'_{cri}$. Then, the determination unit 15 outputs a determination result indicating whether the inducer 2 is abnormal or normal to the output unit 16.

Subsequently, the output unit 16 determines whether the inducer 2 is abnormal or normal based on the determination result (step ST17). When the determination result indicates that the inducer 2 is normal (step ST17; No), the output unit 16 outputs the determination result to the output device 105 (see FIG. 3) such as a display, and the processing in steps ST11 to ST17 is repeated at the next elapsed time t+1. Thereafter, in step ST17, as long as the determination result indicates that the inducer 2 is normal, the processing in steps ST11 to ST17 is repeated at each sampling interval $\Delta T$.

On the other hand, when the determination result indicates that the inducer 2 is abnormal (step ST17: Yes), the output unit 16 outputs the determination result to the output device 105 such as a display, and transmits a stop instruction to the control unit of the rocket 1 so as to safely stop the operation of the rocket 1 (step ST18). In the above manner, a series of processing of the abnormality determination method performed by the abnormality determination device 10 is terminated.

As described above, in the abnormality determination device 10 and the abnormality determination method performed by the abnormality determination device 10, the accumulated fatigue-damage degree $\psi$ of the inducer 2 is calculated based on the stress response applied to the inducer 2, and the lifetime consumption rate $\psi'(t)$ that is a changing rate of the accumulated fatigue-damage degree $\psi$ with respect to time is calculated. Then, based on the accumulated fatigue-damage degree $\psi$ and the lifetime consumption rate $\psi'(t)$, an abnormality of the inducer 2 is determined.

The use time X for which the inducer 2 is used in one flight is predetermined, and it is possible to safely perform the operation of the rocket 1 unless the accumulated fatigue-damage degree $\psi$ of the inducer 2 reaches the end of the lifetime of the inducer 2 during the use time X. For example, by presetting a threshold for the accumulated fatigue-damage degree $\psi$, it can be considered that the inducer 2 is determined to be abnormal when the accumulated fatigue-damage degree $\psi$ exceeds the threshold. However, since damage is accumulated in the inducer 2 of rocket 1 due to various factors, the accumulated fatigue-damage degree $\psi$ is not always accumulated at a certain rate. Thus, when the accumulation speed (lifetime consumption rate $\psi'(t)$) of the accumulated fatigue-damage degree $\psi$ changes, abnormality of the inducer 2 cannot be determined at an appropriate timing. For example, when the threshold is set to be large in consideration of safety, although the rocket 1 is able to be safely operated, the inducer 2 can be determined to be abnormal.

On the other hand, in the abnormality determination device 10, by taking not only the accumulated fatigue-damage degree Iv but also the lifetime consumption rate $\psi'(t)$ into consideration, it is possible to determine an abnormality of the inducer 2 according to the accumulation speed (lifetime consumption rate $\psi'(t)$) of the accumulated fatigue-damage degree $\psi$. As a result, it is possible to improve the accuracy of abnormality determination of the inducer 2.

Specifically, based on the accumulated fatigue-damage degree $\psi$ and the lifetime consumption rate $\psi'(t)$, it is predicted whether the accumulated fatigue-damage degree $\psi$ of the inducer 2 exceeds the lifetime limit (1/sf) of the inducer 2 during the n-th flight of the rocket 1. If the accumulated fatigue-damage degree $\psi$ exceeds the lifetime limit (1/sf) during the n-th flight of the rocket 1, the inducer 2 can be damaged. Thus, when it is predicted that the accumulated fatigue-damage degree $\psi$ exceeds the lifetime limit (1/sf) during the n-th flight of the rocket 1, the inducer 2 is determined to be abnormal. As a result, it is possible to determine an abnormality of the inducer before the inducer 2 is damaged.

More specifically, the remaining lifetime is calculated by subtracting the accumulated fatigue-damage degree $\psi$ from the lifetime limit (1/sf) at the time when the elapsed time t has elapsed from the start time of the n-th flight of the rocket 1. Then, by dividing the remaining lifetime by the lifetime consumption rate $\psi'(t)$ at the elapsed time t, the remaining time tr(t) until the accumulated fatigue-damage degree $\psi$ reaches the lifetime limit (1/sf) is calculated. Then, based on the remaining time tr(t) and the elapsed time t, it is predicted whether the accumulated fatigue-damage degree $N_i$ exceeds the lifetime limit (1/sf) during the n-th flight of the rocket 1. Whether the accumulated fatigue-damage degree $\psi$ exceeds the lifetime limit (1/sf) during the n-th flight of the rocket 1 is determined by the magnitude relation between the sum of the remaining time tr(t) and the elapsed time t, and the use time X. Thus, when the sum of the remaining time tr(t) and the elapsed time t is shorter than the use time X, it is predicted that the accumulated fatigue-damage degree $\psi$ exceeds the lifetime limit (1/sf) during the n-th flight of the rocket 1. That is, based on the assumption that the remaining lifetime is consumed at the lifetime consumption rate $\psi'(t)$, it is predicted whether the accumulated fatigue-damage degree $\psi$ exceeds the lifetime limit (1/sf) during the n-th flight of rocket 1.

For example, since it is predicted that the accumulated fatigue-damage degree $\psi$ does not exceed the lifetime limit (1/sf) at the elapsed time $t_1$ and elapsed time $t_2$ in FIG. 7, the inducer 2 is determined to be normal. However, since it is predicted that the accumulated fatigue-damage degree $\psi$ exceeds the lifetime limit (1/sf) at the elapsed time $t_3$, the inducer 2 is determined to be abnormal. In this manner, by monitoring the lifetime consumption rate $\psi'(t)$ during the flight of the rocket 1 in real time, it is possible to determine whether the lifetime of the inducer 2 is ended during the flight of the rocket 1. For this reason, when the lifetime consumption rate $\psi'(t)$ changes due to some factor during the flight of the rocket 1, it is possible to determine the abnormality of the inducer 2 according to the lifetime consumption rate $\psi'(t)$. As a result, it is possible to improve the accuracy of abnormality determination of the inducer 2.

For example, the excitation force generated in the inducer 2 increases due to some abnormality, and the distortion amplitude increases excessively for the structure. In such a case, since the lifetime limit (1/sf) is set to have a margin for the lifetime of the inducer 2 in order to prevent the inducer 2 from being damaged by high-cycle fatigue, it is possible to stop the engine of the rocket 1 with the margin for the lifetime of the inducer 2.

In addition, when the lifetime consumption rate $\psi'(t)$ is greater than the assumed reference value $\psi'_{cri}$, some kind of abnormality could have occurred in the inducer 2. Thus, by determining that the inducer 2 is abnormal when the lifetime consumption rate $\psi'(t)$ is greater than the reference value $\psi'_{cri}$, it is possible to determine an abnormality of the inducer 2 before the inducer 2 is damaged. As a result, it is possible to improve the accuracy of abnormality determination of the inducer 2.

An embodiment of the present disclosure has been described above, but the present invention is not limited to the above embodiment. For example, the inducer 2 may be provided with a distortion sensor. In this case, the stress-response acquisition unit 12 may directly acquire a stress response based on the distortion of the inducer 2 measured by the distortion sensor. In this case, the pressure acquisition unit 11 can be omitted. Furthermore, when the distortion of the inducer 2 cannot be measured by the distortion sensor, the stress-response acquisition unit 12 may acquire a stress response based on a pressure response. Thus, when the stress (distortion) applied to the inducer 2 cannot be directly measured, by measuring the pressure at the input side of the inducer 2 by the pressure sensor 4, it is possible to indirectly acquire a stress response of the stress applied to the inducer 2.

Furthermore, the accumulated-fatigue-damage-degree calculation unit 13 may calculate the accumulated fatigue-damage degree $\psi'$ by adding the accumulated fatigue-damage degree $\psi_{n-1}$ up to the (n−1)th flight to the accumulated fatigue-damage degree $\psi(t)$. In this case, the accumulated-fatigue-damage-degree calculation unit 13 may output the accumulated fatigue-damage degree $\psi$ to the lifetime-consumption-rate calculation unit 14 and the determination unit 15.

Furthermore, when the determination result indicates that the inducer 2 is abnormal, the output unit 16 may not transmit a stop instruction to the control unit of the rocket 1. An administrator may confirm the determination result output to the output device 105 such as a display and manually transmit the stop instruction to the control unit of the rocket 1.

Moreover, the abnormality determination device 10 may determine not only an abnormality of the inducer 2 of the turbo pump of the rocket 1 but also an abnormality of an inducer for a general industrial pump. In this case, the inducer is used for a predetermined use time X per operation of the pump. Alternatively, the abnormality determination device 10 may determine an abnormality of components used for a predetermined use time X per operation. In either case, the pressure acquisition unit 11, the stress-response acquisition unit 12, the accumulated-fatigue-damage-degree calculation unit 13, the lifetime-consumption-rate calculation unit 14, the determination unit 15, and the output unit 16 operate similarly to those in the above embodiment.

INDUSTRIAL APPLICABILITY

According to the abnormality determination device and the abnormality determination method of the present disclosure, it is possible to improve the accuracy of abnormality determination.

REFERENCE SIGNS LIST

1 Rocket
2 Inducer
4 Pressure sensor
10 Abnormality determination device
11 Pressure acquisition unit
12 Stress-response acquisition unit
13 Accumulated-fatigue-damage-degree calculation unit
14 Lifetime-consumption-rate calculation unit
15 Determination unit
16 Output unit

The invention claimed is:

1. An abnormality determination device that determines an abnormality of an inducer used for a turbo pump of a rocket, the abnormality determination device comprising:
a pressures sensor provided at an input side of the inducer;
a pressure acquisition unit configured to acquire pressure measured by the pressure sensor provided at an input side of the inducer;
a stress-response acquisition unit configured to acquire a stress response indicating a temporal change in stress applied to the inducer;
an accumulated-fatigue-damage-degree calculation unit configured to calculate an accumulated fatigue-damage degree of the inducer based on the stress response;
a lifetime-consumption-rate calculation unit configured to calculate a lifetime consumption rate that is a changing rate of the accumulated fatigue-damage degree with respect to time;

a determination unit configured to determine the abnormality of the inducer based on the accumulated fatigue-damage degree and the lifetime consumption rate; and an output unit configured to transmit a stop instruction to the rocket so as to safely stop operation of the rocket when the determination unit indicates the abnormality, wherein the inducer is used only for a predetermined use time per flight of the rocket, the stress-response acquisition unit is configured to convert a pressure response indicating a temporal change in the pressure into the stress response using a transfer function that defines the relation between the pressure measured by the pressure sensor and a distortion of the inducer, and the determination unit predicts, based on the accumulated fatigue-damage degree and the lifetime consumption rate, whether the accumulated fatigue-damage degree exceeds a lifetime limit defining a limit of a damage degree of the inducer during the operation, and determines that the inducer is abnormal when predicting that the accumulated fatigue-damage degree exceeds the lifetime limit during the operation.

2. The abnormality determination device according to claim 1, wherein the determination unit calculates a remaining lifetime at a time when a predetermined elapsed time has elapsed from a start time of the operation by subtracting the accumulated fatigue-damage degree from the lifetime limit, calculates a remaining time until the accumulated fatigue-damage degree reaches the lifetime limit by dividing the remaining lifetime by the lifetime consumption rate, and predicts, based on the remaining time and the elapsed time, whether the accumulated fatigue-damage degree exceeds the lifetime limit during the operation.

3. The abnormality determination device according to claim 2, wherein the determination unit predicts that the accumulated fatigue-damage degree exceeds the lifetime limit during the operation when the sum of the remaining time and the elapsed time is shorter than the use time.

4. The abnormality determination device according to claim 1, wherein the determination unit determines that the inducer is abnormal when the lifetime consumption rate is greater than a predetermined reference value.

5. An abnormality determination method performed by an abnormality determination device that determines an abnormality of an inducer used for a turbo pump of a rocket, the abnormality determination method comprising:

providing a pressure sensor at an input side of the inducer;

acquiring pressure measured by the pressure sensor provided at an input side of the inducer;

acquiring a stress response indicating a temporal change in stress applied to the inducer;

calculating an accumulated fatigue-damage degree of the inducer based on the stress response;

calculating a lifetime consumption rate that is a changing rate of the accumulated fatigue-damage degree with respect to time;

determining an abnormality of the inducer based on the accumulated fatigue-damage degree and the lifetime consumption rate; and transmitting a stop instruction to the rocket so as to safely stop operation of the rocket when the abnormality of the inducer is determined, wherein the inducer is used only for a predetermined use time per flight of the rocket, the stress response is acquired by converting a pressure response indicating a temporal change in the pressure into the stress response using a transfer function that defines the relation between the pressure measured by the pressure sensor and a distortion of the inducer, and the method further comprises predicting, based on the accumulated fatigue-damage degree and the lifetime consumption rate, whether the accumulated fatigue-damage degree exceeds a lifetime limit defining a limit of a damage degree of the inducer during the operation, and determining that the inducer is abnormal when predicting that the accumulated fatigue-damage degree exceeds the lifetime limit during the operation.

* * * * *